US 6,626,282 B1

(12) United States Patent
Nishizawa et al.

(10) Patent No.: US 6,626,282 B1
(45) Date of Patent: Sep. 30, 2003

(54) TRANSFER SYSTEM (75) Inventors: Yoshihiro Nishizawa, Sayama (JP); Masami Mitsuhashi, Sayama (JP); Keiichi Kubota, Sayama (JP); Kouichi Ikeda, Sayama (JP); Hideo Murakami, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/807,988

(22) PCT Filed: Nov. 4, 1999

(86) PCT No.: PCT/JP99/06130
§ 371 (c)(1),
(2), (4) Date: Aug. 10, 2001

(87) PCT Pub. No.: WO00/26125
PCT Pub. Date: May 11, 2000

(30) Foreign Application Priority Data

Nov. 4, 1998  (JP) ............................................. 10-313524
Nov. 30, 1998 (JP) ............................................. 10-340550

(51) Int. Cl.⁷ .............................................. B65G 29/00
(52) U.S. Cl. ...................... 198/465.2; 198/580; 198/795
(58) Field of Search ........................ 198/465.1, 465.2, 198/465.3, 580, 795

(56) References Cited

U.S. PATENT DOCUMENTS 5,012,917 A * 5/1991 Gilbert et al. ............ 198/465.2
5,271,490 A * 12/1993 Sticht ...................... 198/465.2

FOREIGN PATENT DOCUMENTS

| JP | 58-71049   | * | 4/1983  | ............ 198/465.2 |
| JP | A-61-81320 |   | 4/1986  |                        |
| JP | B2-4-57555 |   | 9/1992  |                        |
| JP | A-4-306162 |   | 10/1992 |                        |
| JP | A-8-215944 |   | 8/1996  |                        |
| JP | A-10-166230|   | 6/1998  |                        |
| JP | A-10-217047|   | 8/1998  |                        |
| SU | 1351749    | * | 11/1987 | ............ 198/465.2 |

* cited by examiner

Primary Examiner—James R. Bidwell
(74) Attorney, Agent, or Firm—Arent Fox Kintner Plotkin & Kahn

(57) ABSTRACT

A transfer line (L) is formed by a first conveyer ($C_1$) and a second conveyer ($C_2$) which are disposed in parallel to each other for transferring a pallet, a first traverser ($T_1$) for transporting the pallet (P) from a terminal end of the first conveyer ($C_1$) to a start end of the second conveyer ($C_2$), and a second traverser ($T_2$) for transporting the pallet (P) from a terminal end of the second conveyer ($C_2$) to a start end of the first conveyer ($C_1$). The first and second conveyers ($C_1$ and $C_2$) are operable to drive main drive rollers (22) provided at start ends of the conveyers by bringing the rollers into abutment against side surfaces of rearmost pallets (P) in the advancing direction, thereby urging and collectively driving a plurality of pallets (P) which are connected together forwardly of the rearmost pallets (P) in a state in contact with the rearmost pallets. This enables the length of the transfer line (L) to be changed as desired without modification of a drive device for the pallet (P).

9 Claims, 11 Drawing Sheets

TRANSFER SYSTEM

FIELD OF THE INVENTION

The present invention relates to a transfer system for carrying out assembling of parts, while circulating a pallet with a work placed thereon along a transfer line forming a closed loop.

BACKGROUND ART

Such a transfer system for carrying out the assembling of parts, while circulating a pallet with a work placed thereon along a transfer line forming a closed loop is conventionally known (see Japanese Patent Publication No.4-57555). In the above known transfer system, a pallet-shaped carriage on which a work can be placed is circulated on rails placed along a quadrilateral transfer line. In this case, the carriage is allowed to travel by connecting and disconnecting an endless chain, circulatively driven along the rails by a drive source, to or from the carriage, or the carriage is allowed to travel pitch by pitch by bringing the carriage into and out of engagement with a rack which is reciprocally driven through a predetermined distance along the rails by a drive source, and during this time, the assembling of parts to the work placed on the carriage is carried out.

However, the above known system suffers from a problem that when the length of the transfer line is to be changed, it is necessary to change the length of the endless chain or of the rack provided along the transfer line, and such replacing work becomes of a large scale, resulting in a great deal of cost required.

Moreover, the known system also suffers from another problem that it is necessary to supply parts to be assembled to a work from the outside, to the carriage in succession and for this reason, it is difficult to enhance the working efficiency. To carry out the operation of assembling the parts to the work, working air is required for enabling lifting and lowering of the work to a level which makes the operation easy, or for driving an air tool such as an impact wrench. However, there is a problem that if the working air is supplied from the outside of the moving carriage, the handling or the attachment and detachment of an air hose is troublesome.

DISCLOSURE OF THE INVENTION

The present invention has been accomplished in view of the above circumstances, and it is a first object of the present invention to provide a transfer system for carrying out the assembling of parts, while circulating a pallet having a work placed thereon along a transfer line forming a closed loop, wherein the length of the transfer line can be changed to any other one without modification of a pallet driving device.

It is a second object of the present invention to provide a transfer system for carrying out the assembling of parts, while circulating a pallet having a work placed thereon along a transfer line forming a closed loop, wherein the operation of assembling parts to the work can be carried out efficiently.

To achieve the first object, according to a first aspect and feature of the present invention, there is provided a transfer system having transfer-in stations and transfer-out stations for assembling parts to a work on a pallet, while circulating the pallet along a transfer line forming a closed loop, the transfer system comprising a first conveyer and a second conveyer which are disposed in parallel to each other to transfer a plurality of pallets in an abutting state, a first traverser for transporting the pallets individually from a terminal end of the first conveyer to a start end of the second conveyer, and a second traverser for transporting the pallets individually from a terminal end of the second conveyer to a start end of the first conveyer, the first and second conveyers and the first and second traversers being disposed in the same horizontal plane to form the transfer line, the transfer-in stations and the transfer-out stations being disposed adjacent each other on or in the vicinity of the first and second traversers, the first and second conveyers being operable to drive the pallets by bringing friction rollers which are rotated by a drive source mounted at a fixed side, into abutment against the pallet.

With the above arrangement, the first conveyer, the first traverser, the second conveyer and the second traverser are disposed in the same horizontal plane to define the transfer line forming the closed loop for transferring the pallets, and the first and second conveyers drive the pallets by bringing the rotated friction rollers into abutment against the pallet. Therefore, the number of the pallets can be increased and decreased only by changing the lengths of the first and second conveyers without making any modification to the friction rollers, and thus it is extremely easy to change the length of the transfer system. Moreover, while keeping the structure simple and of a low cost, the generation of vibration and noises can be prevented to drive the pallet smoothly. In addition, the transfer-in stations and the transfer-out stations for carrying out the transfer of the work onto and out of the pallet are disposed adjacent each other on or in the vicinity of the first and second traversers. Therefore, most of the transfer line is used ensuring space and time for carrying out the assembling of the parts to the maximum, along which line the work can be transferred, whereby useless space and time required for returning of an empty pallet can be maintained to the minimum.

To achieve the first object, according to a second aspect and feature of the present invention, in addition to the first feature, the transfer-in station for transferring the work onto the pallet and the transfer-out station for transferring the work from the pallet are disposed adjacent to each other on or in the vicinity of the first and second traversers.

With the above arrangement, the transfer-in and out stations for transferring the work onto and out of the pallet are disposed adjacent each other on or in the vicinity of the first and second traversers. Therefore, most of the transfer line is used ensuring space and time for carrying out the assembling of the parts to the maximum, along which line the work can be transferred, whereby useless space and time required for returning of an empty pallet can be maintained to the minimum.

To achieve the first object, according to a third aspect and feature of the present invention, in addition to the first feature, the transfer-in station for transferring a part tray to the pallet and the transfer-out station for transferring the part tray from the pallet are disposed adjacent each other on or in the vicinity of the first and second traversers.

With the above arrangement, the transfer-in and out stations for transferring the part tray to and out of the pallet are disposed adjacent each other on or in the vicinity of the first and second traversers. Therefore, most of the transfer line is used ensuring space and time for carrying out the assembling of the parts to the maximum, along which line the part tray can be transferred, whereby useless space and time required for returning of an empty pallet can be maintained to the minimum.

To achieve the first object, according to a fourth aspect and feature of the present invention, in addition to the first feature, the first and second traversers include transfer means for transporting the work at a terminal end of either one of the first and second conveyers to a start end of the other of the first and second conveyers.

With the above arrangement, the work at the terminal end of either one of the first and second conveyers can be transported to the start end of the other of the first and second conveyers by the transfer means provided on the traversers and hence, the smooth transporting of the pallet can be carried out.

To achieve the first object, according to a fifth aspect and feature of the present invention, in addition to the fourth feature, the transfer means have transfer surfaces capable of being lifted and lowered relative to the bottom surface of the pallet on the first and second conveyers, between positions which are higher and lower respectively than the bottom surface of the pallet.

With the above arrangement, the transfer surface of the transfer means is lifted and lowered relative to the bottom surface of the pallet on the first and second conveyers, between positions which are higher and lower respectively than the bottom surface of the pallet. Therefore, the transporting of the pallet between the first and second traversers and the first and second conveyers can be conducted smoothly.

To achieve the first object, according to a sixth aspect and feature of the present invention, in addition to the fourth feature, the transfer system further includes a cylinder for pushing out the pallet from the terminal ends of the first and second traversers to the start ends of the first and second conveyers.

With the above arrangement, the pallet is pushed out from the terminal ends of the first and second traversers to the start ends of the first and second conveyers by the cylinder and therefore, the transporting of the pallet from the first and second traversers to the first and second conveyers can be conducted smoothly.

To achieve the first object, according to a seventh aspect and feature of the present invention, in addition to the first feature, the transfer system further includes an air tank which is mounted on the pallet and in which air for driving an air tool is stored, and an air supply means provided at least at one place on the transfer line for supplying air to the air tank.

With the above arrangement, the air tool can be driven by the air stored in the air tank mounted on the pallet and therefore, the handling of an air hose is simplified, and also the operability of the air tool is improved, as compared with a case where air is supplied from the outside of the pallet. Moreover, the air can be supplied to the air tank, while the pallet is being circulated along the transfer line. Therefore, the supplying of the air to the air tank can be conducted easily.

To achieve the second object, according to an eighth aspect and feature of the present invention, there is provided a transfer system having a transfer-in station and a transfer-out station for assembling parts to a work on a pallet, while circulating the pallet along a transfer line forming a closed loop, the pallet including a part support for supporting parts and an air tank in which working air for assembling the parts to the work is stored, and an air supply means being provided at least at one place on the transfer line for charging air in the air tank.

With the above arrangement, the pallet includes the part support for supporting the parts to be assembled to the work and hence, it is unnecessary to sequentially supply the parts from the outside to the pallet moving along the transfer line, leading to an enhanced operability. Moreover, the parts can be assembled to the work by the air stored in the air tank mounted on the pallet without sequential supplying of the air from the outside to the pallet moving along the transfer line, and hence, the handling of an air hose is simplified. In addition, the air can be supplied to the air tank, while the pallet is being circulated along the transfer line. Therefore, the supplying of the air to the air tank can be conducted easily.

To achieve the second object, according to a ninth aspect and feature of the present invention, in addition to the eighth feature, the work supported on work support jigs provided on the pallet is lifted and lowered by air cylinders connected to the air tank.

With the arrangement, the work supported on the work support jigs is lifted and lowered by the air cylinders and hence, the work can be supported in a position suitable for the operation, whereby the part assembling operation can be carried out efficiently. Moreover, the air cylinders can be driven by the air stored in the air tank mounted on the pallet without sequential supplying of the air from the outside to the pallet moved along the transfer line and hence, the handling of an air hose to the air cylinders is simplified.

With the above arrangement, the air tool is driven by the air stored in the air tank mounted on the pallet without sequential supplying of the air from the outside to the pallet moved along the transfer line. Therefore, the handling of the air hose to the air tool is simplified, and also the operability of the air tool is improved.

To achieve the second object, according to an eleventh aspect and feature of the present invention, in addition to the eighth feature, the work support jigs provided on the pallet are capable of being lifted and lowered to levels suitable for the operation.

With the above arrangement, since the work support jigs provided on the pallet are capable of being lifted and lowered to the level suitable for the operation, the work can be supported in a position suitable for the operation, whereby the part assembling operation can be carried out efficiently.

To achieve the first object, according to a twelfth aspect and feature of the present invention, in addition to the first feature, a working space, in which an operator can move, is provided inside the transfer line forming the closed loop, so that access of the operator to the pallet is enhanced by the working space.

With the above arrangement, it is possible for the operator to access any of the pallets through the working space at a low speed. The brake rollers 23, 23 apply a braking force to one of the plurality of pallets P moved by the main drive rollers 22, 22, which is located at the terminal end of the first conveyer $C_1$, thereby preventing the pallet P from overrunning onto the first traverser $T_1$. The transfer-out drive rollers 24, 24 are driven at a speed higher than that of the main drive rollers 22, 22, when one pallet P located at the terminal end of the first conveyer $C_1$ is to be separated from the succeeding pallet P and moved to the start end of the first traverser $T_1$. The transfer-in drive rollers 21, 21 are driven at a speed higher than that of the main drive rollers 22, 22, when one pallet P located at the terminal end of the second traverser $T_2$ is to be moved to the start end of the first conveyer $C_1$ to catch up with the final pallet P on the first conveyer $C_1$.

BRIEF DESCRIPTION OF THE DRAWINGS

FIGS. 1 to 8B show a first embodiment of the present invention, wherein

FIGS. 9 and 10 show a second embodiment of the present invention, wherein

BEST MODE FOR CARRYING OUT THE INVENTION

Figure 1:
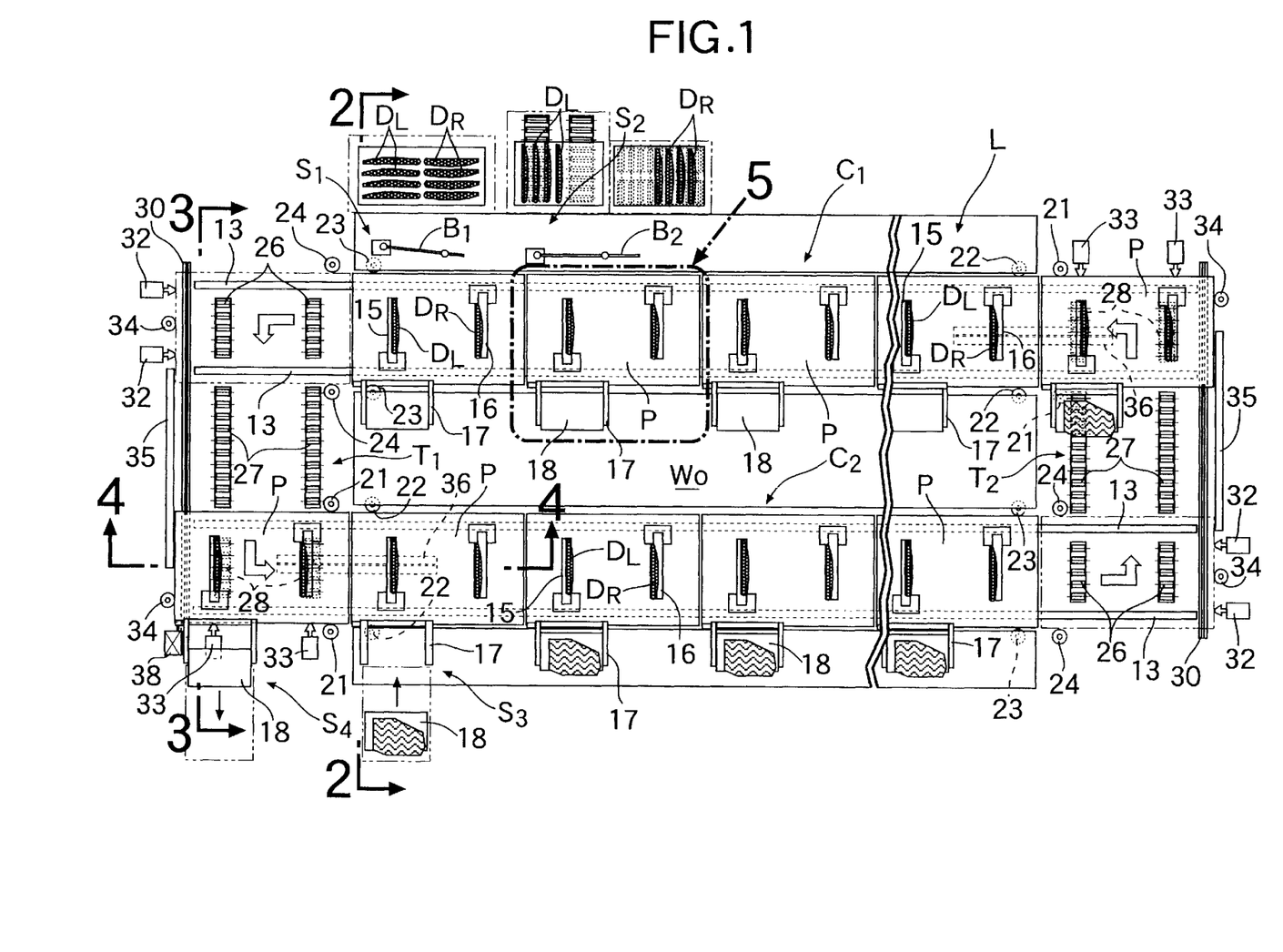
FIG. 1 is a plan view of a sub-line for sub-assembling a door of an automobile.

As shown in FIG. 1, a transfer system of this embodiment is utilized in a sub-line provided sideways of a main line for assembling an automobile, and is operable to assemble parts by an operator riding on a pallet P, while circulating left and right rear doors $D_L$ and $D_R$ as works removed from a vehicle body of an automobile flowing in a main line on a closed transfer line L in a state in which they have been placed on the pallet P. The left and right rear doors $D_L$ and $D_R$ having the parts assembled thereto are returned to the main line where they are attached again to the vehicle body of the automobile.

The transfer line L in the transfer system is comprised of a first conveyer $C_1$ and a second conveyer $C_2$ disposed in parallel to each other, a first traverser $T_1$ extending from a terminal end of the first conveyer $C_1$ toward a start end of the second conveyer $C_2$, and a second traverser $T_2$ extending from a terminal end of the second conveyer $C_2$ toward a start end of the first conveyer $C_1$. The entire transfer line L is formed into a rectangular shape having long sides along transferring directions of the first and second conveyers $C_1$ and $C_2$ and short sides along transferring directions of the first and second traversers $T_1$ and $T_2$.

A work transfer-in station $S_1$ and a work transfer-out station $S_2$ are disposed adjacent each other sideways of the first conveyer $C_1$. The doors $D_L$ and $D_R$ transferred from the main line by a carriage (not shown) are temporarily stored in the work transfer-in station $S_1$, and a pair of the left and right doors $D_L$ and $D_R$ are sequentially transported from the work transfer-in station $S_1$ onto each of the pallets P of the transfer system at a transporting device $B_1$. The pallet P which has received the pair of the left and right doors $D_L$ and $D_R$ in the work transfer-in station $S_1$ is circulated from the terminal end of the first conveyer $C_1$ on the first traverser $T_1$, the second conveyer $C_2$ the second traverser $T_2$ and the first conveyer $C_1$. When the doors $D_L$ and $D_R$ to which the parts have been attached during this time reach the work transfer-out station $S_2$, they are expelled from the pallet P by a transporting device $B_2$. A predetermined numbers of the doors $D_L$ and $D_R$ are placed onto the carriage and returned to the main line.

Figure 5:
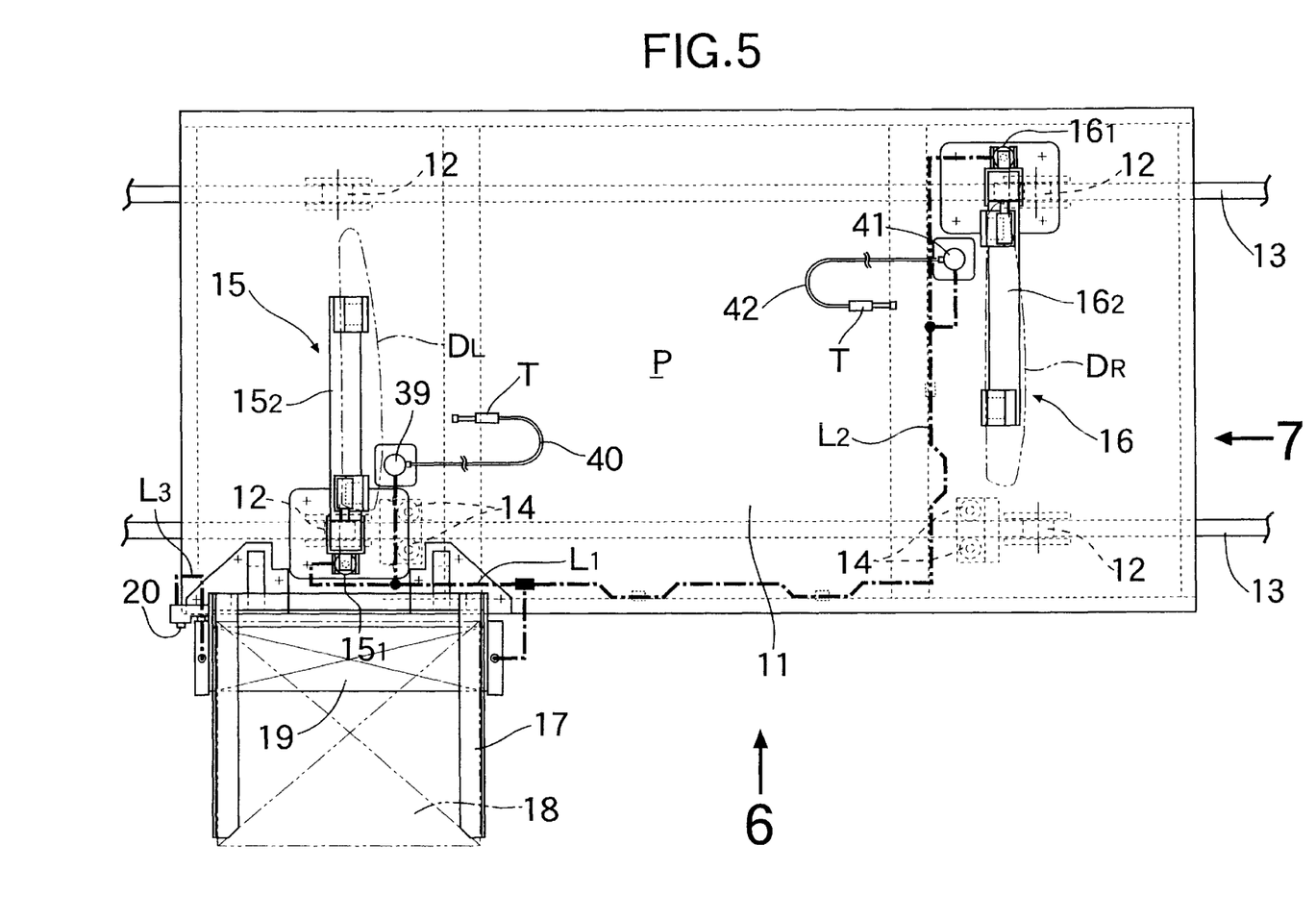
FIG. 5 is an enlarged view of a portion indicated by 5 in FIG. 1.
Figure 6:
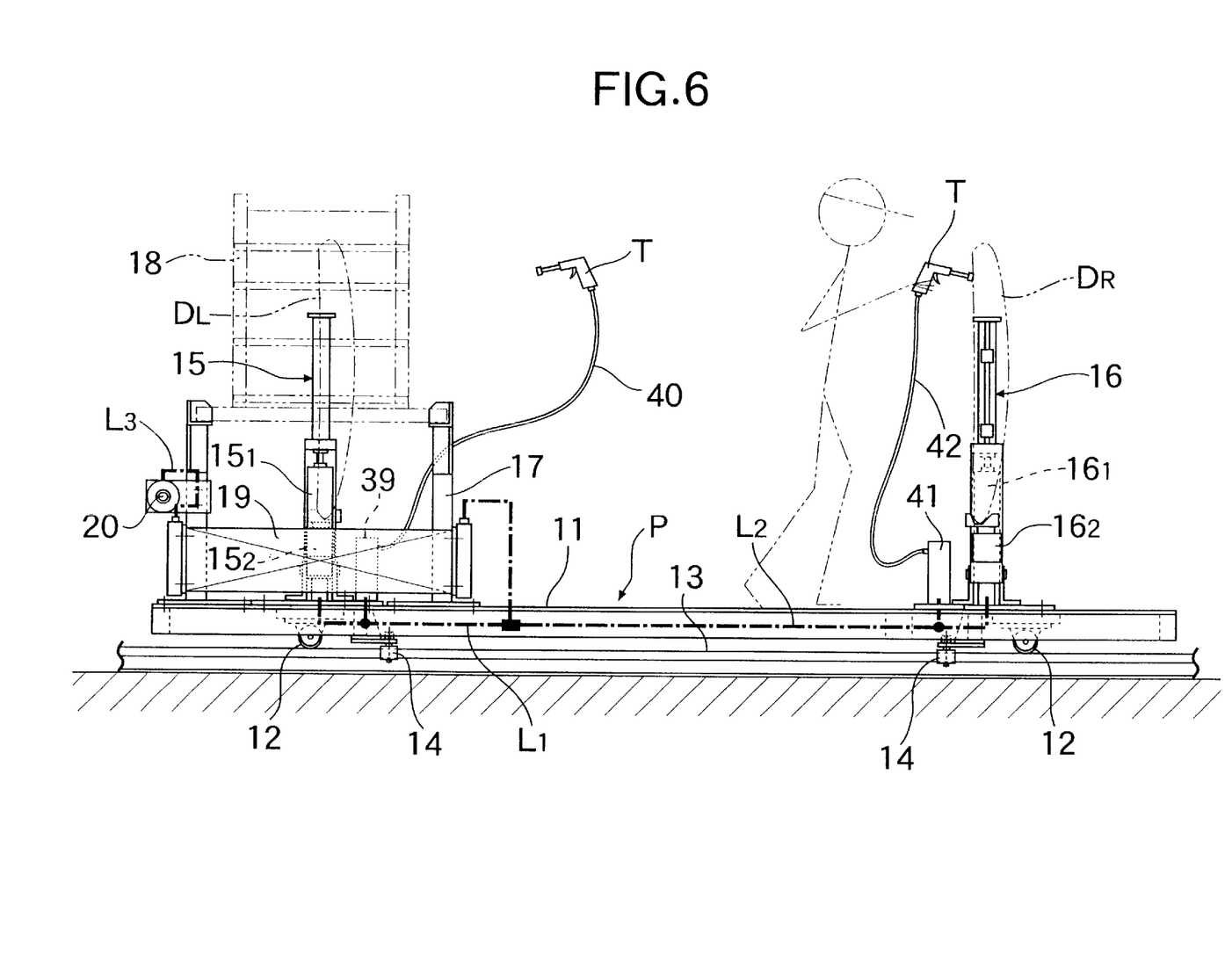
FIG. 6 is a view taken in the direction of an arrow 6 in FIG. 5.
Figure 7:
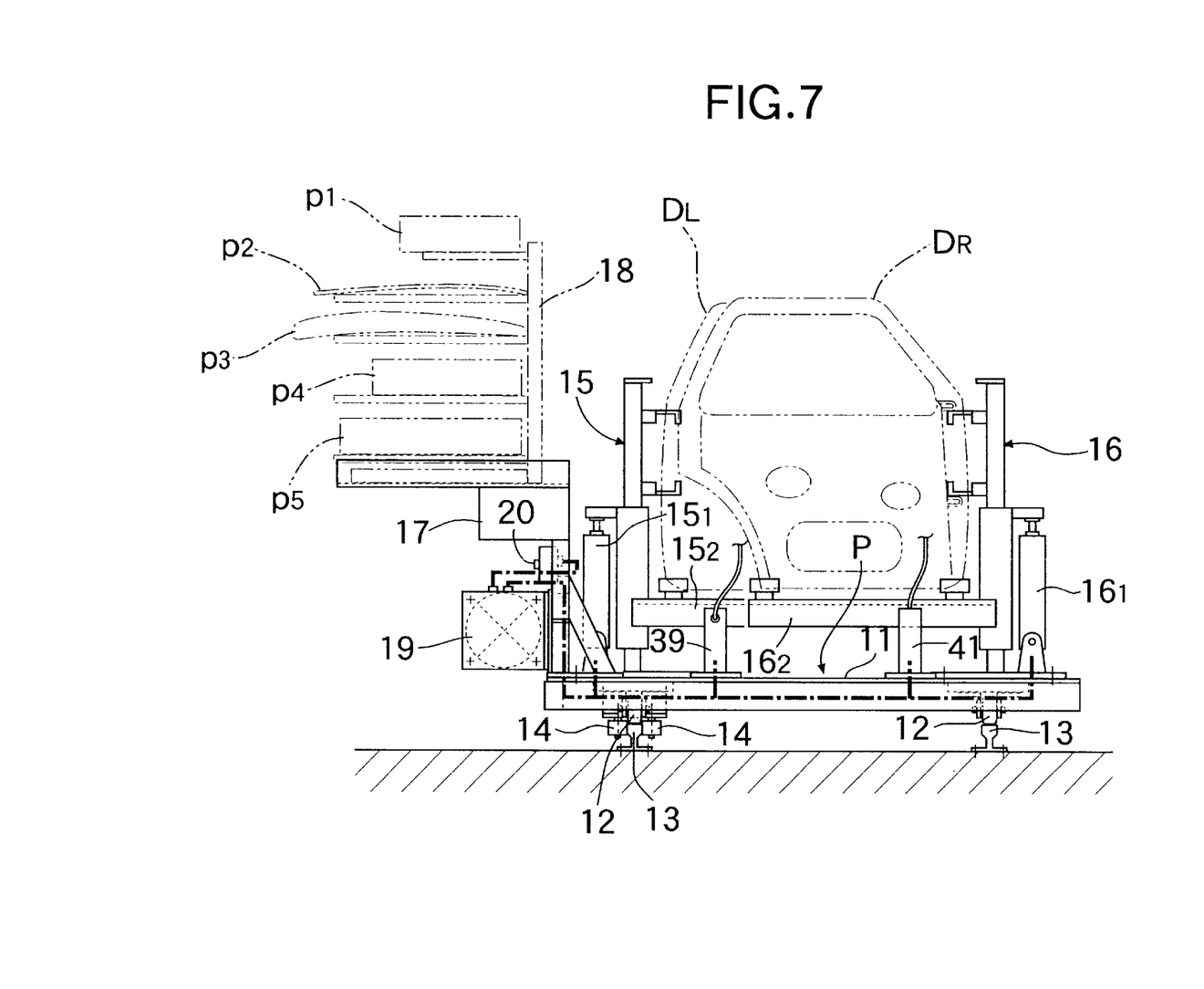
FIG. 7 is a view taken in the direction of an arrow 7 in FIG. 5.

The structure of the pallet P will be described with reference to FIGS. 5 to 7.

The pallet P includes a base plate 11 formed into a quadrilateral plate-shape, and four casters 12 are mounted on a lower surface of the base plate 11. Each of the first and second conveyers $C_1$ and $C_2$ has a pair of rails 13, 13, so that the four casters 12 are guided on the rails 13, 13. A pair of guide rollers 14, 14 are respectively provided in the vicinity of the two casters 12, 12 on laterally one side of the pallet P, so that the casters 12 is prevented from being derailed from the rails 13, 13 by rolling of the guide rollers 14, 14 along opposite side surfaces of either one of the rails 13.

Two door supporting jigs 15 and 16 forming work supporting jigs of the present invention are raised on an upper surface of the pallet P. The left door $D_L$ is supported in a righted attitude on a support arm $15_2$ which is provided on one of the door supporting jigs 15 and lifted and lowered by an air cylinder $15_1$, and the right door $D_R$ is supported in a righted attitude on a support arm $16_2$ which is provided on the other door supporting jig 16 and lifted and lowered by an air cylinder $16_1$. A tray support 17 forming a part support of the present invention is provided at laterally one side of the pallet P to protrude in a lateral direction, so that a multi-stage part tray 18, on which parts $p_1$ to $p_5$ (a window glass, an inner panel, a small-size part and the like) to be assembled to each of the doors $D_L$ and $D_R$ placed on the pallet P have previously been set, can be placed on the tray support 17.

An air tank 19 filled with air is mounted on the pallet P, so that air for driving the air cylinders $15_1$ and $16_1$ and air for driving an air tool T such as an impact wrench for assisting in the assembling of the parts $p_1$ to $p_5$ on the pallet P are supplied from the air tank 19. More specifically, a piping $L_1$ extending from the air tank 19 is connected to the air cylinder $15_1$ of the door support jig 15 for the left door $D_L$ and to an air tool connection 39 provided in the vicinity of the air cylinder $15_1$, and the air tool T is releasably connected to the air tool connection 39 through an air hose 40. Likewise, a piping $L_2$ extending from the air tank 19 is connected to the air cylinder $16_1$ of the door support jig 16 for the right door $D_R$ and to an air tool connection 41 provided in the vicinity of the air cylinder $16_1$, and the air tool T is releasably connected to the air tool connection 41 through an air hose 42.

A coupling 20 and a piping $L_3$ for supplementing air to the air tank 19 from the outside are mounted on the tray support 17 of the pallet P.

Figure 2:
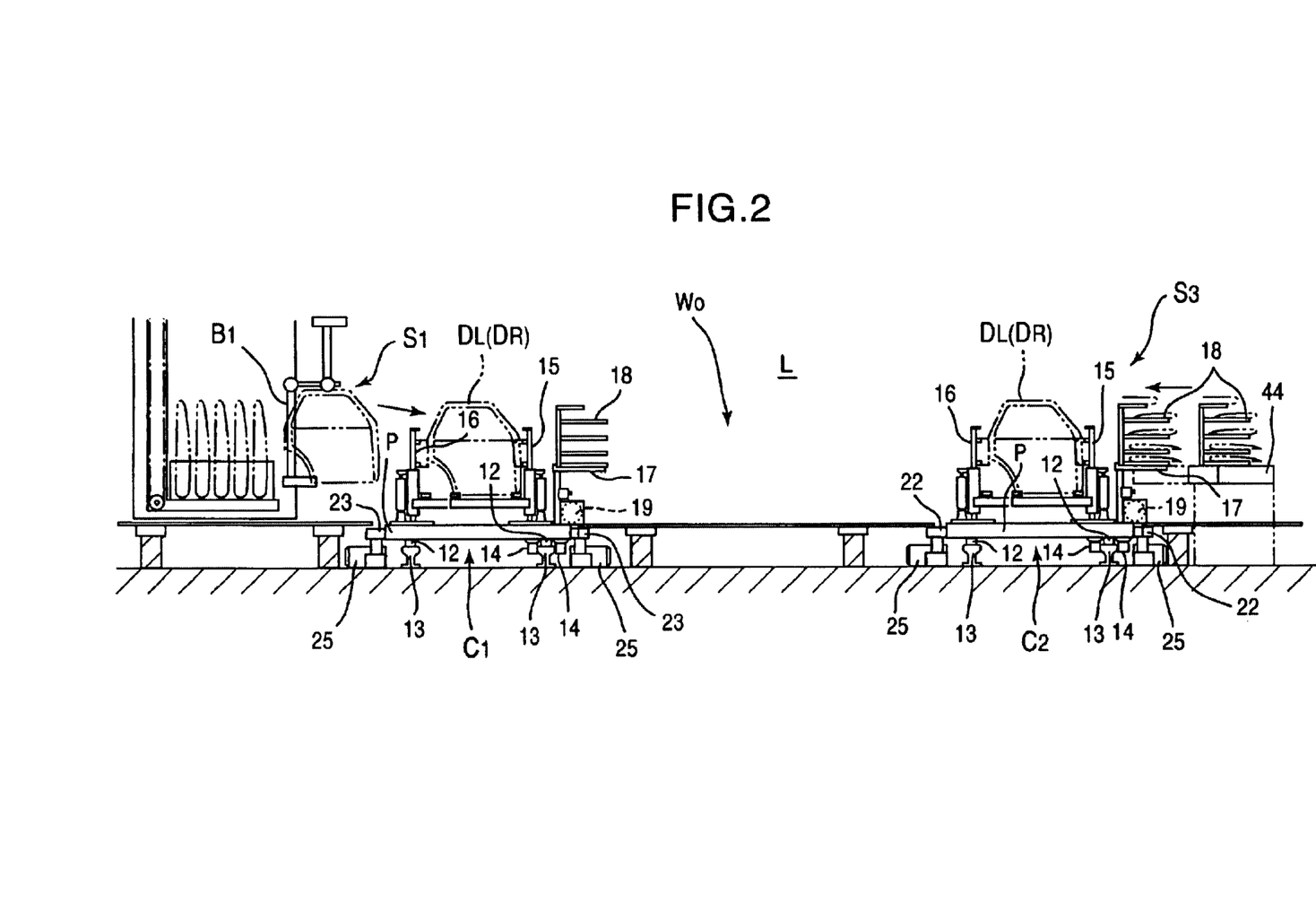
FIG. 2 is a sectional view taken along a line 2—2 in FIG. 1.
Figure 4:
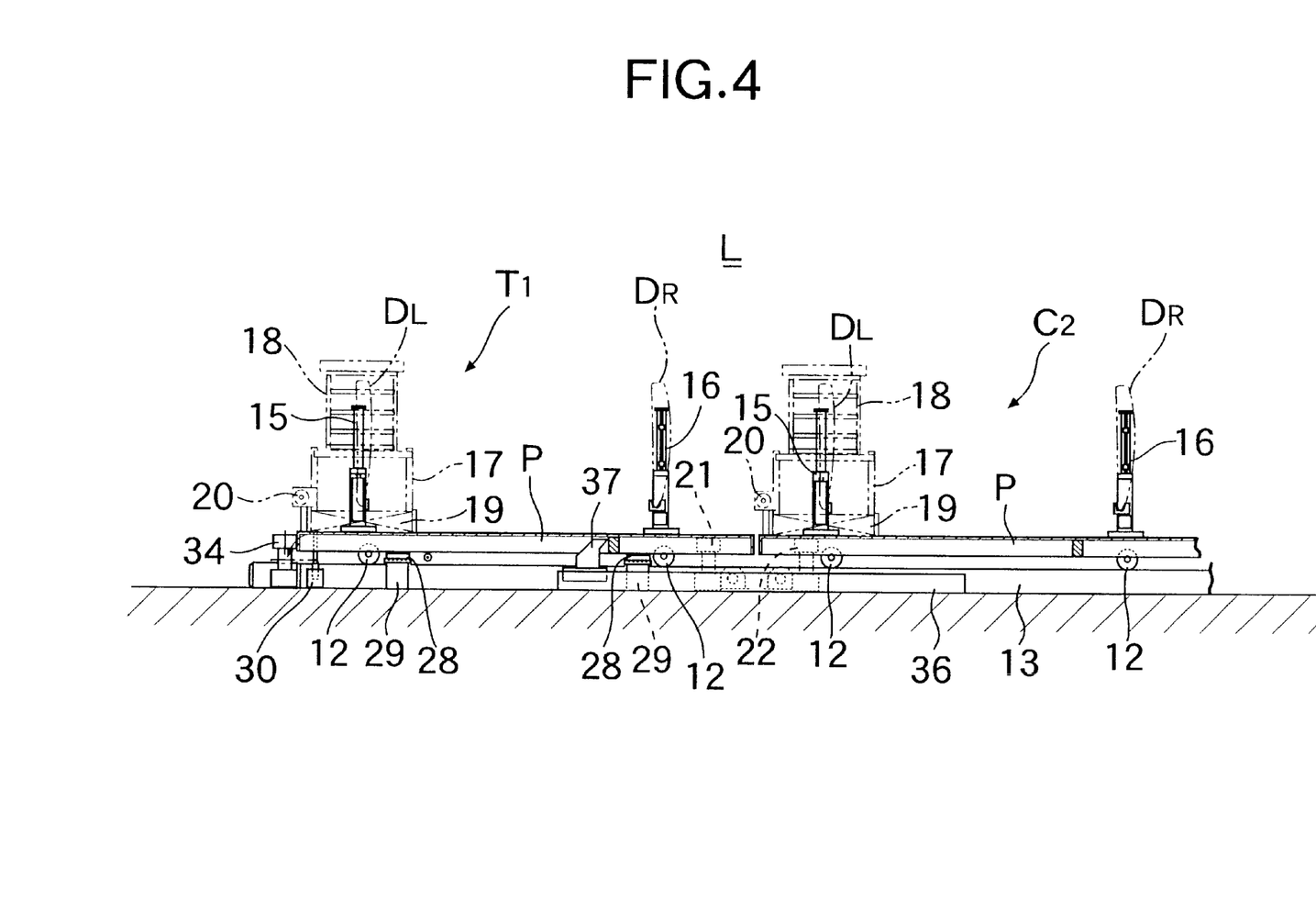
FIG. 4 is a sectional view taken along a line 4—4 in FIG. 1.

The structures of the first and second conveyers $C_1$ and $C_2$ will be described below with reference to FIGS. 1, 2 and 4. The first and second conveyers $C_1$ and $C_2$ are disposed point-symmetrical with respect to the center of the transfer system and have substantially the same structure and hence, the structure of the first conveyer $C_1$ will be described below as a representative.

The first conveyer $C_1$ includes the pair of left and right rails 13, 13 for guiding the four casters 12 of the pallet P, and opposite ends of the rails 13, 13 extend within the first and second traversers $T_1$ and $T_2$. A pair of left and right transfer-in drive rollers 21, 21 and a pair of main drive rollers 22, 22 are mounted at the start end of the first conveyer $C_1$, and a pair of left and right brake rollers 23, 23 and a pair of left and right transfer-out drive rollers 24, 24 are mounted at the terminal end of the first conveyer $C_1$. Each of the rollers 21, 21; 22, 22; 23, 23; and 24, 24 forming friction rollers of the present invention is formed of a elastic material such as a rubber, and driven by a motor 25 mounted at a lower portion thereof to abut against the left and right long sides of the pallet P to generate a driving force or a braking force. The pallets P are moved by abutment of the rollers 21, 21; 22, 22; 23, 23; and 24, 24 formed of such an elastic material and hence, the structure of the drive system for the first and second conveyers $C_1$ and $C_2$ can be extremely simplified, and also the generation of a vibration and a noise can be maintained to the minimum to drive the pallets P smoothly.

A plurality of the pallets P are disposed without gaps on the first conveyer $C_1$, and the main drive rollers 22, 22 urge the plurality of pallets P laying on the first conveyer $C_1$ from the rear to move them simultaneously by continuously driving one pallet P located at the start end of the first conveyer $C_1$ at a low speed. The brake rollers 23, 23 apply a braking force to one of the plurality of pallets P moved by the main drive rollers 22, 22, which is located at the terminal end of the first conveyer $C_1$, thereby preventing the pallet P from overrunning onto the first traverser $T_1$. The transfer-out drive rollers 24, 24 are driven at a speed higher than that of the main drive rollers 22, 22, when one pallet P located at the terminal end of the first conveyer $C_1$ is to be separated from the succeeding pallet P and moved to the start end of the first traverser $T_1$. The transfer-in drive rollers 21, 21 are driven at a speed higher than that of the main drive rollers 22, 22, when one pallet P located at the terminal end of the second traverser $T_1$ is to be moved to the start end of the first conveyer $C_1$ to catch up with the final pallet P on the first conveyer $C_1$.

A loaded tray transfer-in station $S_3$ is provided at the start end of the second conveyer $C_2$ for supplying the part tray 18 on which the parts $P_1$ to $P_4$ to be assembled to the doors $D_L$ and $D_R$ placed on the pallet P have been set.

Figure 3:
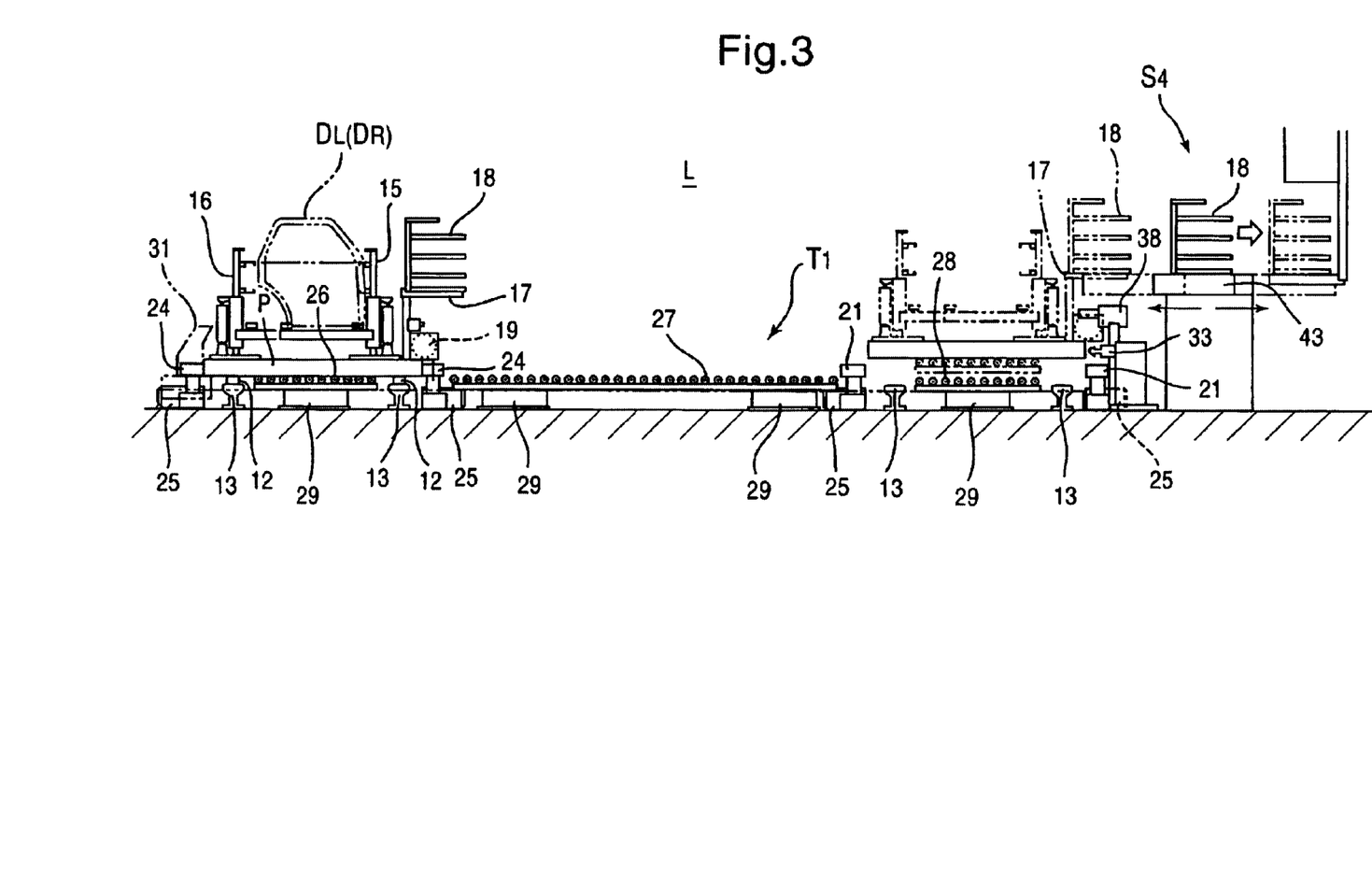
FIG. 3 is a view taken along a line 3—3 in FIG. 1.

The structures of the first and second traversers $T_1$ and $T_2$ will be described below with reference to FIGS. 1, 3 and 4. The first and second traversers $T_1$ and $T_2$ are disposed point-symmetrically with respect to the center of the transfer system and have substantially the same structure and hence, the structure of the first traverser $T_1$ will be described below as a representative.

The first traverser $T_1$ has three roller conveyers 26, 27 and 28 capable of supporting the lower surface of the pallet P. The roller conveyers 26, 27 and 28 are disposed in line from the terminal end of the first conveyer $C_1$ toward the start end of the second conveyer $C_2$. Each of the roller conveyers 26, 27 and 28 is capable of being lifted and lowered synchronously by cylinders 29, and the level of the transfer surface thereof in a lifted position is higher than the level of the lower surface of the pallet P on the first and second conveyers $C_1$ and $C_2$, while the level of the transfer surface thereof in a lowered position is lower than the level of the lower surface of the pallet P on the first and second conveyers $C_1$ and $C_2$.

Each roller of the roller conveyers 26, 27 and 28 is a free roller having no drive source, and the movement of the pallet P is carried out by a rodless cylinder 30 disposed along one side of the first traverser $T_1$. An output member 31 reciprocally movable along the rodless cylinder 30 is capable of being righted up and tilted down. The righted-up output member 31 is engaged with one of short sides of the pallet P, and the tilted-down output member 31 is retreated downwards, so that it does not interfere with the pallet P.

Two stoppers 32, 32 are provided at the start end of the first traverser $T_1$ and capable of abutting against the front short side of the pallet P in an advancing direction of the pallet P to stop the pallet P moved from the first conveyer $C_1$ to the start end of the first traverser $T_1$. Two stoppers 33, 33 are provided at the terminal end of the first traverser $T_1$ and capable of abutting against the front long side of the pallet P in the advancing direction of the pallet P to stop the pallet P moved from the start end of the first traverser $T_1$ to the terminal thereof. Provided at one side of the first traverser $T_1$ are two guide rollers 34, 34 for guiding the right short side of the pallet P in the advancing directions, and a single guide rail 35.

A rodless cylinder 36 is mounted between the terminal end of the first traverser $T_1$ and the start end of the second conveyer $C_2$, and an output member 37 reciprocally movable along the rodless cylinder 36 is capable of being righted up and tilted down between a position in which it engages the lower surface of the pallet P and a position in which it does not interfere with the lower surface of the pallet P.

An empty-tray transfer-out station $S_4$ for discharging the empty part tray 18 from the pallet P is provided at the terminal end of the first traverser $T_1$. An air supply means 38 is provided in the empty-tray transfer-out station $S_4$ and connected to the coupling 20 mounted on the pallet P for supplying air.

The operation of the embodiment of the present invention having the above-described arrangement will be described below.

When empty one of the plurality of pallets P moved on the first conveyer $C_1$ at a low speed, which is first in the advancing direction, is passed through the work transfer-in station $S_1$, a pair of left and right doors $D_L$ and $D_R$ are transported to the door support jigs 15 and 16 of such empty pallet P by the transporting device $B_1$. At this time, the plurality of pallets P are connected together in close contact with one another on the first conveyer $C_1$, and the pallet P lying at the terminal end of the second traverser $T_2$ is in succession behind a pallet $P_1$ in the advancing direction, which lies at the end of the plurality of pallets P in the advancing direction (namely, behind the pallet P lying at the start end of the first conveyer $C_1$).

When the pallet P having the doors $D_L$ and $D_R$ transported thereto in the work transfer-in station $S_1$ reaches the position at the transfer-out drive rollers 24, 24 which are being rotated at a high speed, such pallet P is separated from the succeeding pallet P and moved to the start end of the first traverser $T_1$. At this time, the three roller conveyers 26, 27 and 28 of the first traverser $T_1$ are in their lowered positions and hence, the roller conveyer 26 laying between the two rails 13, 13 of the first conveyer $C_1$ and the pallet P cannot interfere with each other. The pallet P which has newly reached the work transfer-in station $S_1$ of the first conveyer $C_1$ is braked by contact with the brake rollers 23, 23 generating the braking force and thus, is prevented from overrunning to the start end of the first traverser $T_1$. The leading pallet P in the advancing direction on the second conveyer $C_2$ is separated from the succeeding pallet P in parallel with the operation of the first conveyer $C_1$ and is moved to the start end of the second traverser $T_2$.

Figure 8A:
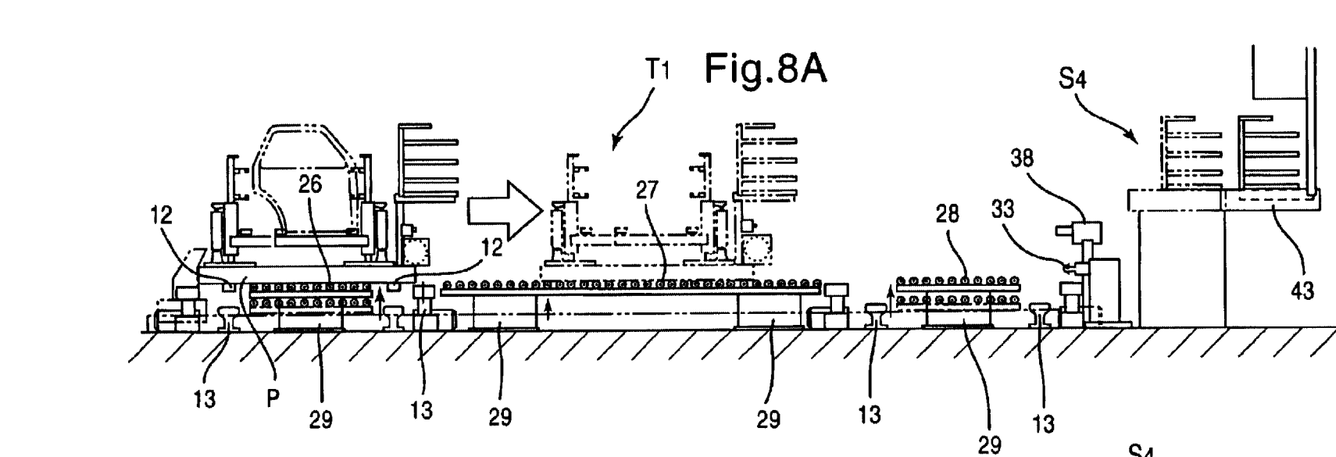
FIGS. 8A and 8B are views for explaining the operation of a traverser.

Now, when the pallet P moved from the terminal end of the first conveyer $C_1$ to the start end of the first traverser $T_1$ is put into abutment against the stoppers 32, 32 and thus stopped, the cylinders 29 are expanded to lift the three roller conveyers 26, 27 and 28 synchronously, whereby the pallet P is lifted by the roller conveyer 26 on the side of the start end (see FIG. 8A). Then, when the output member 31 is righted up to engage one of the long sides of the pallet P, the pallet P pushed by the output member 31 driven by the rodless cylinder 30 is moved on the roller conveyers 26, 27 and 28 and put into abutment against the stoppers 33, 33 at the terminal end of the first traverser $T_1$ and thus stopper (see FIG. 8B). At this time, there is no possibility that the pallet P may interfere with the rails 13 of the first and second conveyers $C_1$ and $C_2$, because the roller conveyers 26, 27 and 28 are in their lifted positions.

Figure 8B:
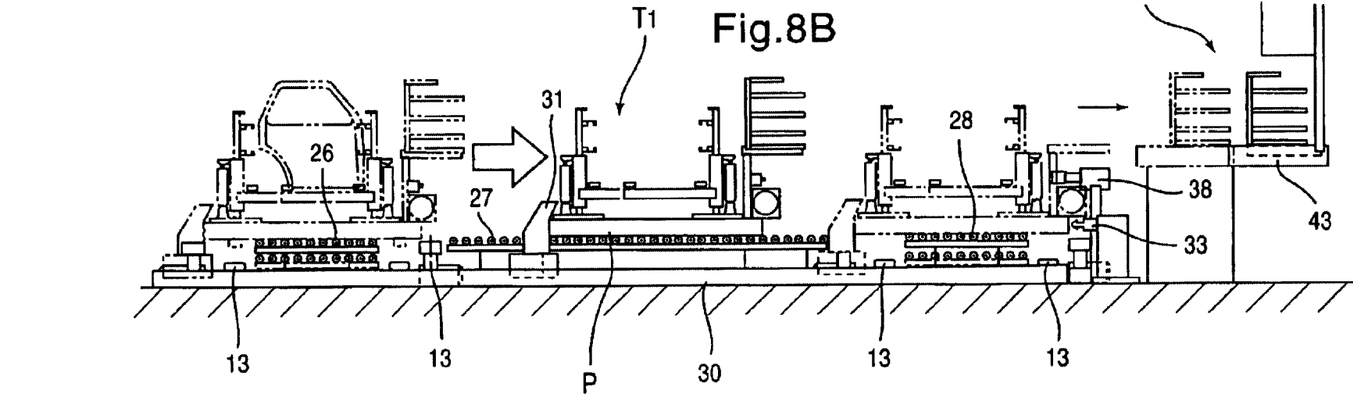

When the pallet P has reached the terminal end of the first traverser $T_1$, the cylinders 29 are contracted to lower the roller conveyers 26, 27 and 28, whereby the pallet P carried on the roller conveyer 28 is transported onto the rails 13, 13 of the second conveyer $C_2$. When the pallet P is moved from the start end to the terminal end of the first traverser $T_1$ in the above manner, the pallet P is moved in a similar action from the start end to the terminal end of the first traverser $T_1$ in parallel with the above-described movement.

In this manner, the roller conveyers 26, 27 and 28 of the first and second traversers $T_1$ and $T_2$ are lifted and lowered to deliver the pallets P between the first and second conveyers $C_1$ and $C_2$. Therefore, it is possible to prevent the pallets P from interfering with the first and second conveyers $C_1$ and $C_2$ to smoothly transport the pallets P between the first and second conveyers $C_1$ and $C_2$ and the first and second traversers $T_1$ and $T_2$. The central roller conveyer 27 need not be necessarily lifted and lowered, and may be fixed in the lifted position.

The empty-tray transfer-out station $S_4$ is provided at the terminal end of the first traverser $T_1$, and the empty part tray 18 supported on the tray support 17 on the pallet P is removed and discharged to the empty-tray transfer-out station $S_4$ by an automatic discharge conveyer 43. At the same time, the air supply means 38 provided in the empty-tray transfer-out station $S_4$ is connected to the coupling 20 of the pallet P, and air is filled into the air tank 19.

Since the air tank 19 is mounted on the pallet P, as described above, the handling of the air hose can be simplified, as compared with a case where air is supplied from the outside of the pallet P. Moreover, even if the pallet P is moved, the same air tool T can be used continuously, leading to an enhanced operability. Further, air can be supplied to the air tank 19, while the pallet P is being circulated along the transfer line L, and hence, it is extremely easy to supply air to the air tank 19.

Then, the pallet P at the terminal end of the first traverser $T_1$ is moved to the start end of the second conveyer $C_2$ by the transfer-in drive rollers 21, 21 and connected to the pallet P at the end of the plurality of pallets P moved at a low speed on the second conveyer $C_2$ in the advancing direction. At this time, the rodless cylinder 36 is operated to cause the output member 37 to urge the pallet P, thereby assisting in the operation of the transfer-in drive rollers 21, 21. In parallel with this, the pallet P at the terminal end of the second traverser $T_2$ is also moved on the first conveyer $C_1$ by the transfer-in drive rollers 21, 21 and the rodless cylinder 36 and is connected to the pallet P at the end of the plurality of pallets P moved at a low speed on the first conveyer $C_1$ in the advancing direction.

When the pallet P which has moved from the terminal end of the first traverser $T_1$ to the start end of the second conveyer $C_2$ is passed through the loaded tray transfer-in station $S_3$, the part tray 18, on which the parts $p_1$ to $p_5$ to be assembled to the doors DL and $D_R$ have been set, is placed on the tray support 17 of the pallet P by an automatic supply conveyer 44.

Two operators riding on the pallet P complete the operation of assembling the parts $p_1$ to $p_5$ on the part tray 18 to the doors $D_L$ and $D_R$ within a period of movement of the pallet P from the first conveyer $C_1$ via the second traverser $T_2$ to the work transfer-out station $S_2$ of the first conveyer $C_1$. During this time, air for operating the air tool T such as the impact wrench is supplied from the air tank 19 mounted on the pallet P, and air for operating the air cylinders $15_1$ and $16_1$ for lifting the doors $D_L$ and $D_R$ to a level suitable for the operation is also supplied from the air tank 19. When the pallet P has reached the work transfer-out station $S_2$ of the first conveyer $C_1$, the doors $D_L$ and $D_R$ which have been assembled are discharged from the pallet P to the work transfer-out station $S_2$, thus finishing the process of one cycle.

By previously mounting the part tray 18, on which the parts $p_1$ to $p_5$ to be assembled to the doors $D_L$ and $D_R$ have been set, on the pallet P, it is unnecessary to conduct the sequential supplying of the parts to the pallet P which is being moved, leading to a remarkably enhanced operability.

As described above, the first and second conveyers $C_1$ and $C_2$ can collectively drive the plurality of pallets P connected in contact with one another forwards by driving the rearmost pallet P by the main drive rollers 22, 22. Therefore, if it is necessary to prolong the lengths of the first and second conveyers $C_1$ and $C_2$, only the lengths of the rails 13 of the first and second conveyers $C_1$ and $C_2$ may be prolonged, and it is unnecessary to provide any change to the main drive rollers 22, 22 and the other rollers 21, 21; 23, 23; and 24, 24. Therefore, it is extremely easy to modify the length of the transfer line L.

Most of the closed transfer line L for circulation of the pallets P are utilized for the operation of assembling the parts $p_1$ to $p_5$ and hence, a portion of the transfer line L required for only the returning of the empty pallets P is nearly eliminated, thereby providing an effective utilization of a space. On the contrast, in the prior art in which a return line for returning an empty pallet P is provided separately from an operating line for transferring a loaded pallet P having doors $D_L$ and $D_R$, a space in which the returning line is provided is useless. In a system in which a returning line is provided within a pit made by drilling a floor surface in order to avoid the uselessness of a space, there is a problem that the making of the pit by drilling becomes of a large scale and hence, the working cost is increased remarkably. With the transfer system according to the present invention, however, it is extremely easy to change the length of the transfer line L, and also an assembling line having a high operability can be constructed at a minimum space and a minimum equipment cost.

Further, a working space $W_0$ is provided inside the transfer line L surrounded by the first and second conveyers $C_1$ and $C_2$ and the first and second traversers $T_1$ and $T_2$ (see FIGS. 1 and 2), and hence, it is possible for the operator to easily access any of the pallets P on the transfer line L through the working space $W_0$, leading to a further enhanced operability.

Although the embodiments of the present invention have been described in detail, it will be understood that the present invention is not limited to the above-described embodiments, and various modifications in design may be made without departing from the spirit and scope of the invention defined in claims.

Figure 9:
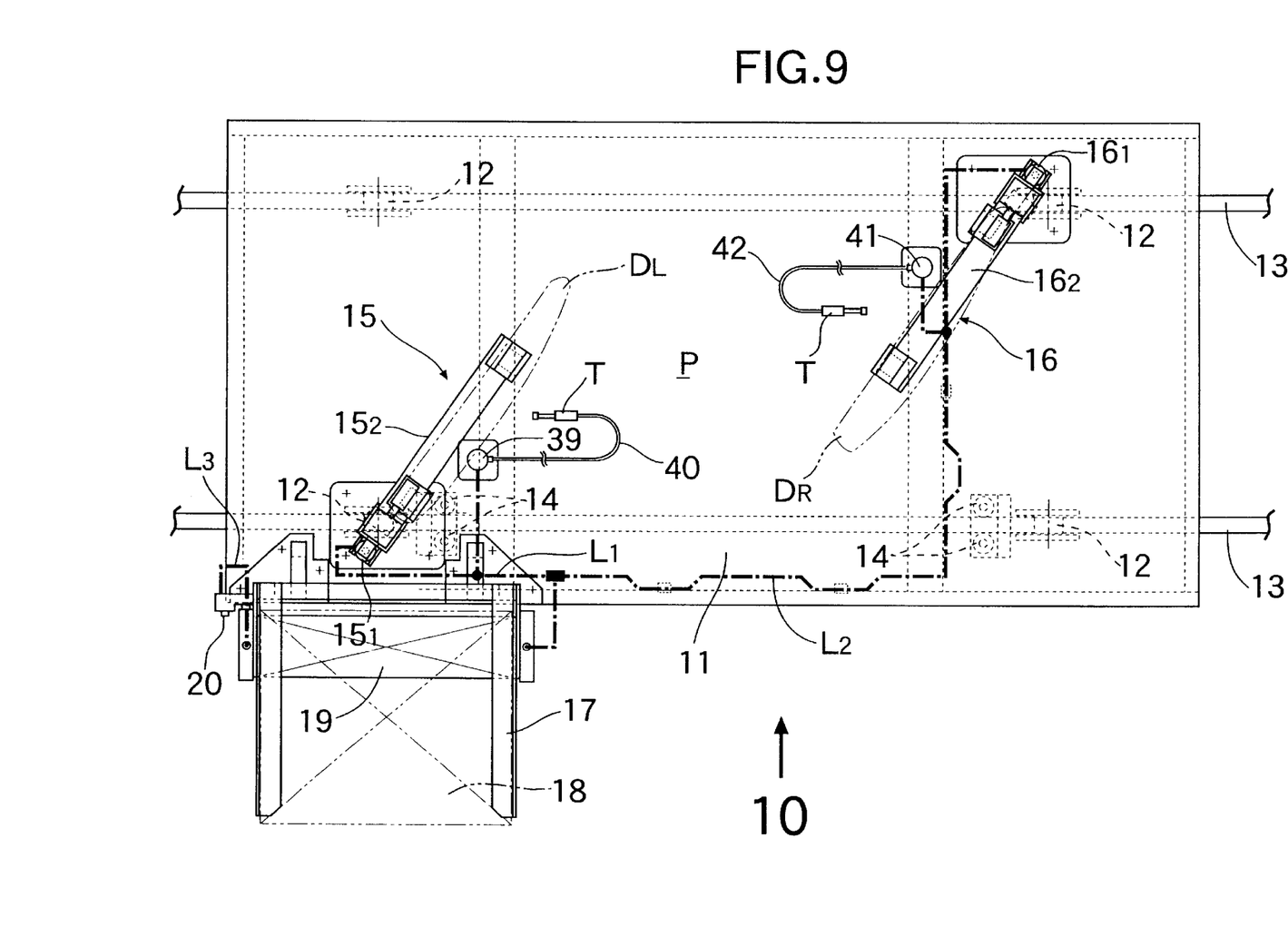
FIG. 9 is a view similar to FIG. 5.
Figure 10:
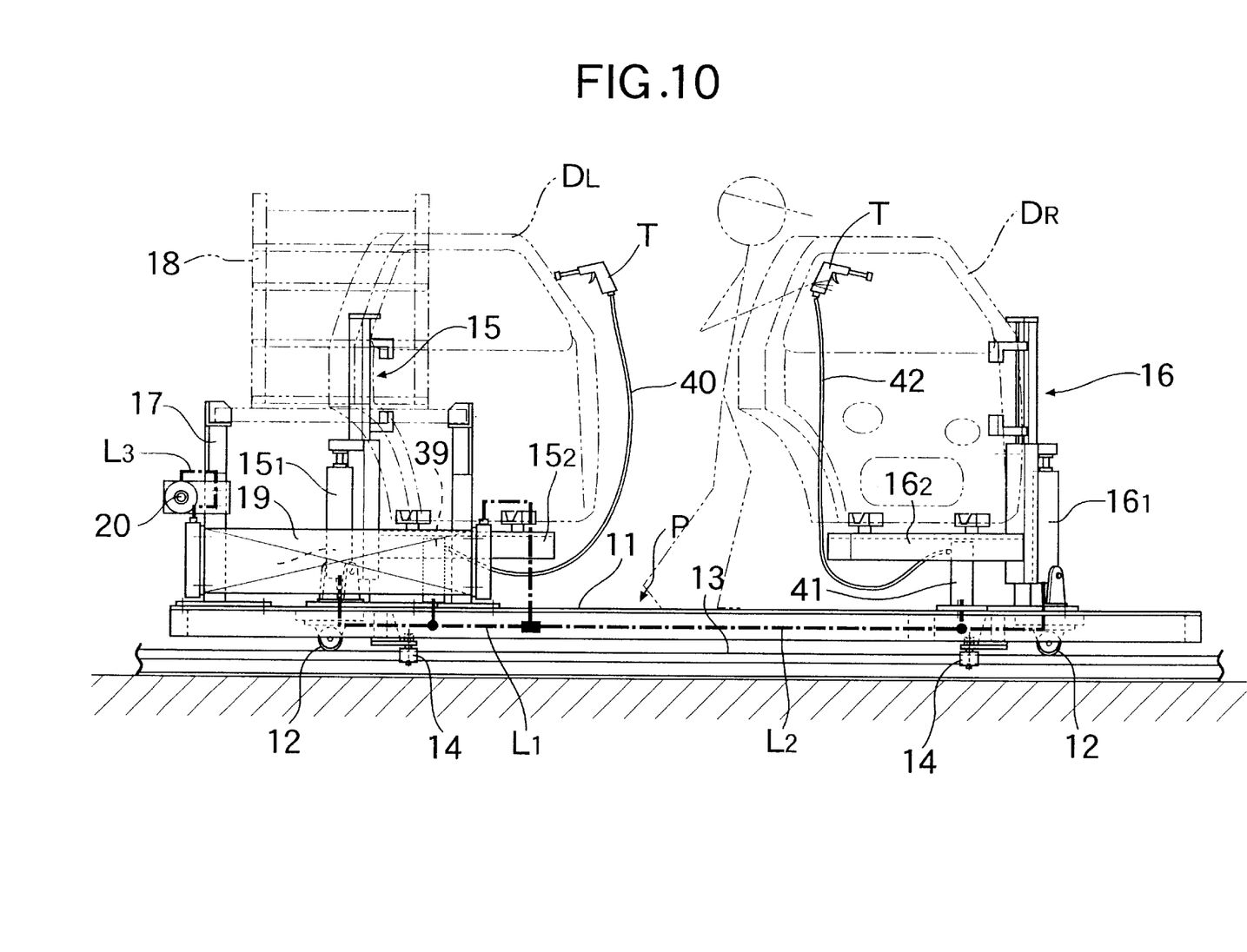
FIG. 10 is a view taken in the direction of an arrow 10 in FIG. 9.

For example, the left and right doors $D_L$ and $D_R$ are supported at an attitude perpendicular to the lengthwise direction of the pallet P in the first embodiment, but if the left and right doors $D_L$ and $D_R$ are supported obliquely with respect to the lengthwise direction of the pallet P, as illustrated in the second embodiment shown in FIGS. 9 and 10, a space on the upper surface of the pallet P can be utilized effectively to enhance the operability.

Figure 11:
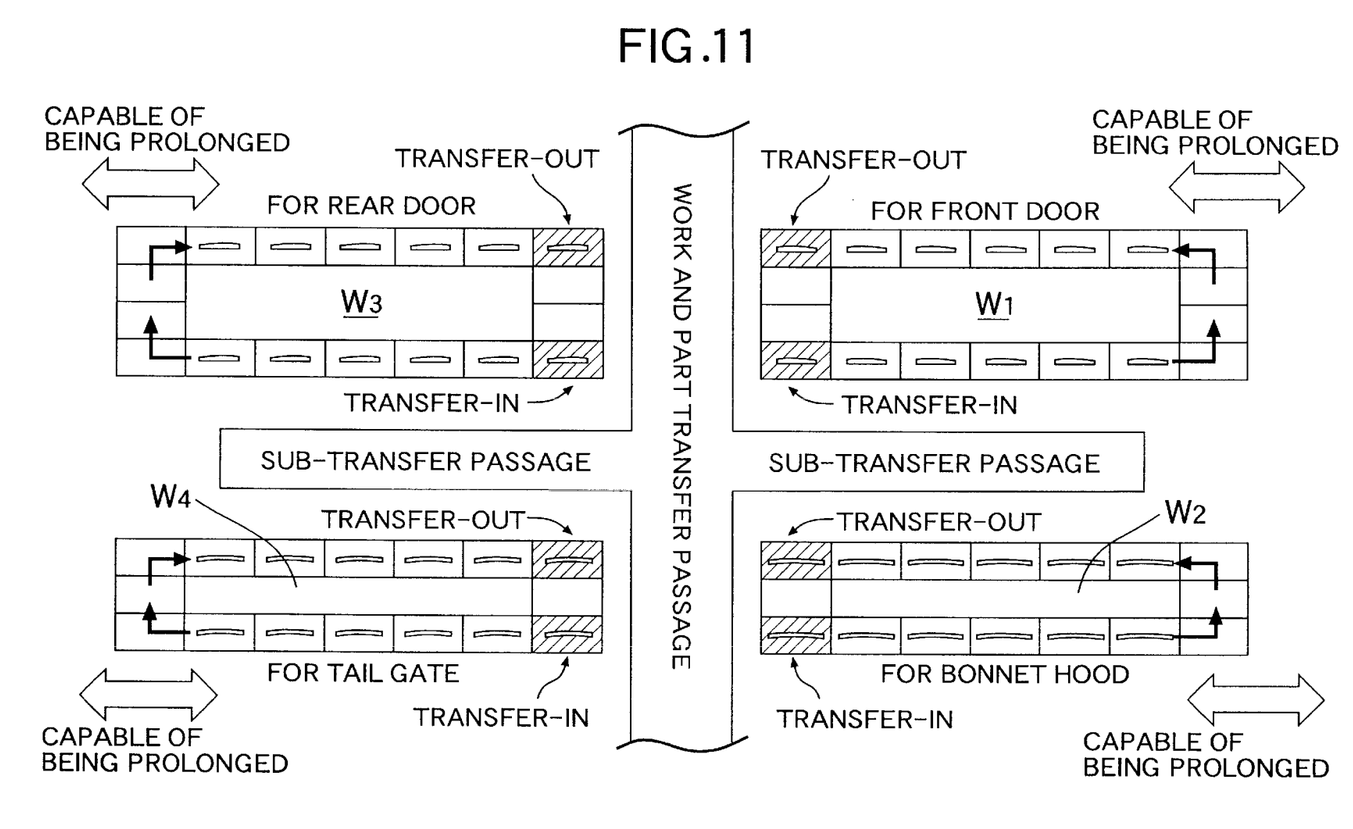
FIG. 11 shows a third embodiment of the present invention, which is a view showing a combination of four sub-lines for sub-assembling a rear door, a tail gate, a front door and a bonnet hood.

In a third embodiment shown in FIG. 11, a plurality of transfer systems are disposed in a distributed manner on opposite left and right sides of a work and part transfer passage provided centrally. The left upper transfer system is used for assembling rear doors; the left lower transfer system is used for assembling a tail gate; the right upper transfer system is used for assembling front doors; and the right lower transfer system is used for assembling a bonnet hood. A work transfer-in and out stations and a part transfer-in and out station are provided at each of ends of the transfer systems facing the centrally provided work and part transfer passage. The employment of this layout ensures that the central transfer passage can commonly be used and a space can be utilized further effectively, and also the length of the transfer systems can be increased or decreased as required and hence, it is possible to easily accommodate to the change in type of the system or the like. If each of the transfer-in stations and the transfer-out stations shown by drawing oblique lines is formed of a lifter, and works and parts are transferred in and out through an overhead conveyer, the area of the transfer passage can be reduced.

Even in the third embodiment, working spaces $W_1$ to $W_4$ are provided inside four transfer lines L and therefore, it is possible for an operator to easily access any of the pallets P through any of the working spaces $W_1$ to $W_4$, leading to a further enhanced operability.

The present invention is applicable to a line for assembling any work other than a door, a tail gate and a bonnet hood of an automobile.

The positions of the work transfer-in station $S_1$, the work transfer-out station $S_2$ the part tray transfer-in station $S_3$ and the part tray transfer-out station $S_4$ are not limited to those in the embodiments, and it is enough to only dispose them adjacent one another on or in the vicinity of the first and second traversers $T_1$ and $T_2$.

The three roller conveyers 26, 27 and 28 of the first and second traversers $T_1$ and $T_2$ are lifted and lowered to deliver the pallets P to the first and second conveyers $C_1$ and $C_2$ in the embodiments, but on the contrary, the levels of the three roller conveyers 26, 27 and 28 are fixed, and some of the rails 13, 13 of the first and second conveyers $C_1$ and $C_2$ intersecting the three roller conveyers 26, 27 and 28 can be lifted and lowered to deliver the pallets P to the first and second traversers $T_1$ and $T_2$.

INDUSTRIAL APPLICABILITY

As described above, such transfer system according to the present invention is useful for carrying out the operation of assembling parts to any work on the pallet of the conveyer, and particularly, is suitably applicable to a sub-line for assembling sub-assemblies for a four-wheel or two-wheel vehicle.

What is claimed is:

1. A transfer system having transfer-in stations and transfer-out stations for assembling parts to a work on a pallet, while circulating said pallet along a transfer line forming a closed loop, said transfer system comprising a first conveyer and a second conveyer which are disposed in parallel to each other to transfer a plurality of pallets in an abutting state, a first traverser for transporting said pallets individually from a terminal end of said first conveyer to a start end of said second conveyer, and a second traverser for transporting said pallets individually from a terminal end of said second conveyer to a start end of said first conveyer, said first and second conveyers and said first and second traversers being disposed in the same horizontal plane to form said transfer line, said transfer-in stations and said transfer-out stations being disposed adjacent to each other on or in the vicinity of one of said first and second traversers, said first and second conveyers being operable to drive the pallets by bringing friction rollers, which are rotated by a drive source mounted at a fixed side, into abutment against the pallet, and means for supplying to said pallets being provided on at least one of said first and second traversers.

2. A transfer system according to claim 1, wherein said transfer-in and transfer out stations are used for transferring said work onto and from said pallet.

3. A transfer system according to claim 1, wherein said transfer-in stations are used for transferring a part tray to and from the pallet.

4. A transfer system according to claim 1, wherein said first and second traversers include transfer means for transporting the work at a terminal end of either one of said first and second conveyers to a start end of the other of said first and second conveyers.

5. A transfer system according to claim 4, wherein said transfer means have transfer surfaces capable of being lifted and lowered relative to the bottom surface of the pallet on said first and second conveyers between positions which are higher and lower respectively than the bottom surface of the pallet.

6. A transfer system according to claim 4, further including a cylinder for pushing out the pallet from the terminal ends of said first and second traversers to the start ends of said first and second conveyers.

7. A transfer system according to claim 1, further including an air tank which is mounted on the pallet and in which air for driving an air tool is stored, and said means for supplying to said pallet is an air supply means for supplying air to said air tank.

8. A transfer system having transfer-in stations and transfer-out stations for assembling parts to a work on a pallet, while circulating said pallet along a transfer line forming a closed loop, said transfer system comprising a first conveyer and a second conveyer which are disposed in parallel to each other to transfer a plurality of pallets in an abutting state, a first traverser for transporting said pallets individually from a terminal end of said first conveyer to a start end of said second conveyer, and a second traverser for transporting said pallets individually from a terminal end of said second conveyer to a start end of said first conveyer, said first and second conveyers and said first and second traversers being disposed in the same horizontal plane to form said transfer line, said transfer-in stations and said transfer-out stations being disposed adjacent to each other on or in the vicinity of one of said first and second traversers, said first and second conveyers being operable to drive the pallets by bringing friction rollers, which are rotated by a drive source mounted at a fixed side, into abutment against the pallet, and further including an air tank which is mounted on the pallet and in which air for driving an air tool is stored, and an air supply means for supplying air to said air tank.

9. A transfer system having transfer-in stations and transfer-out stations for assembling parts to a work on a pallet, while circulating said pallet along a transfer line forming a closed loop, said transfer system comprising a first conveyer and a second conveyer which are disposed in parallel to each other to transfer a plurality of pallets in an abutting state, a first traverser for transporting said pallets individually from a terminal end of said first conveyer to a start end of said second conveyer, and a second traverser for transporting said pallets individually from a terminal end of said second conveyer to a start end of said first conveyer, said first and second conveyers and said first and second traversers being disposed in the same horizontal plane to form said transfer line, said transfer-in stations and said transfer-out stations being disposed contiguous to each other on or in the vicinity of one of said first and second traversers, said first and second conveyers being operable to drive the pallets by bringing friction rollers, which are rotated by a drive source mounted at a fixed side, into abutment against the pallet.

* * * * *